(12) United States Patent
Ziebarth et al.

(10) Patent No.: US 7,438,739 B2
(45) Date of Patent: Oct. 21, 2008

(54) CATALYZED SOOT FILTER

(75) Inventors: Robin Paul Ziebarth, Midland, MI (US); Robert Thomas Nilsson, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 474 days.

(21) Appl. No.: 11/189,531

(22) Filed: Jul. 26, 2005

(65) Prior Publication Data

US 2006/0018806 A1 Jan. 26, 2006

Related U.S. Application Data

(60) Provisional application No. 60/591,060, filed on Jul. 26, 2004.

(51) Int. Cl.
*B01D 46/00* (2006.01)
*B01D 53/34* (2006.01)
*F01N 3/023* (2006.01)

(52) U.S. Cl. .................... 55/523; 55/282.3; 55/385.3; 55/524; 55/DIG. 5; 55/DIG. 10; 55/DIG. 30; 95/273; 95/278; 60/299; 60/311; 422/180; 264/628; 264/630; 264/631; 264/DIG. 48

(58) Field of Classification Search ............... 55/282.2, 55/282.3, 385.3, 523, 524, DIG. 5, DIG. 10, 55/DIG. 30; 95/273, 278; 60/297, 299, 301, 60/311; 422/177, 180; 423/213.2, 213.3, 423/213.5; 264/628, 630, 631, DIG. 48; 502/439

See application file for complete search history.

(56) References Cited

U.S. PATENT DOCUMENTS

| | | | |
|---|---|---|---|
| 3,460,523 A | 8/1969 | Stiles et al. | |
| 4,294,806 A * | 10/1981 | Abe et al. ................ | 422/180 |
| 4,515,758 A | 5/1985 | Domesle et al. | |
| 4,740,360 A | 4/1988 | Geus et al. | |
| 5,013,705 A | 5/1991 | Koberstein et al. | |
| 5,063,192 A | 11/1991 | Murakami et al. | |
| 5,098,455 A | 3/1992 | Doty et al. | |
| 5,130,109 A | 7/1992 | Wan | |
| 5,173,349 A | 12/1992 | Yavuz et al. | |
| 5,194,154 A | 3/1993 | Moyer et al. | |
| 5,198,007 A * | 3/1993 | Moyer et al. ............. | 55/523 |
| 5,254,519 A | 10/1993 | Wan et al. | |
| 5,322,537 A * | 6/1994 | Nakamura et al. ........ | 55/523 |
| 5,340,516 A | 8/1994 | Yavuz et al. | |
| 5,611,831 A * | 3/1997 | Matsuoka et al. ......... | 55/523 |
| 5,939,354 A | 8/1999 | Golden | |
| 5,993,762 A | 11/1999 | Rajaram et al. | |
| 6,117,400 A * | 9/2000 | Naka et al. .............. | 422/180 |
| 6,306,335 B1 | 10/2001 | Walin et al. | |
| 6,423,415 B1 | 7/2002 | Greene et al. | |
| 6,596,665 B2 | 7/2003 | Wallin et al. | |
| 6,669,751 B1 | 12/2003 | Ohno et al. | |
| 6,710,014 B2 * | 3/2004 | Domesle et al. .......... | 502/439 |
| 6,764,664 B2 | 7/2004 | Zhang | |
| 6,815,393 B2 | 11/2004 | Noda et al. | |
| 7,052,532 B1 * | 5/2006 | Liu et al. ................ | 55/524 |
| 2001/0038810 A1 | 11/2001 | Wallin et al. | |
| 2002/0044897 A1 | 4/2002 | Kakwani et al. | |
| 2002/0132727 A1 | 9/2002 | Labarge et al. | |
| 2002/0197191 A1 | 12/2002 | Takeshima et al. | |
| 2003/0124037 A1 | 7/2003 | Vss et al. | |
| 2004/0020359 A1 | 2/2004 | Koermer et al. | |
| 2004/0057879 A1 * | 3/2004 | Aizawa et al. ........... | 422/177 |
| 2005/0031513 A1 * | 2/2005 | McNamara et al. ....... | 422/177 |

FOREIGN PATENT DOCUMENTS

| | | |
|---|---|---|
| EP | 1142619 A1 | 10/2001 |
| GB | 1119180 | 7/1968 |
| JP | 200117449 | 8/2002 |
| WO | WO97/00119 | 1/1997 |
| WO | WO99/12642 | 3/1999 |
| WO | WO00/62923 | 10/2000 |
| WO | WO01/02083 | 1/2001 |
| WO | WO02/070106 A1 | 9/2002 |
| WO | WO03/011437 | 2/2003 |
| WO | WO03/051488 A1 | 6/2003 |
| WO | WO03/082773 | 10/2003 |
| WO | WO2004/011124 A1 | 2/2004 |
| WO | WO2004/011386 A1 | 2/2004 |

* cited by examiner

Primary Examiner—Jason M Greene

(57) ABSTRACT

An improved catalyzed soot filter is comprised of a porous ceramic having, on at least a portion of the porous ceramic, an amorphous catalytic phase comprised of an alkali containing oxide glass having therein Si, Al or combination thereof. The improved catalyzed soot filter may be formed by contacting a porous ceramic such as mullite, silcon carbide or cordierite with an alkali containing compound that is a silicate, aluminate or alumino-siliicate and heating to a temperature sufficient to form an amorphous catalytic phase fused to at least a portion of the porous ceramic.

30 Claims, No Drawings

CATALYZED SOOT FILTER

CROSS-REFERENCE TO RELATED APPLICATION

This application claims the benefit of U.S. Provisional Application Ser. No. 60/591,060, filed Jul. 26, 2004, which is hereby incorporated by reference.

FIELD OF THE INVENTION

The present invention relates to an improved catalyzed particulate filter.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. When using such a filter, the filter must be periodically regenerated by burning off the soot. However, because the temperature where Diesel soot ignites is significantly higher than the normal operating temperature of a Diesel engine, a number of catalysts have been proposed to reduce the ignition temperature of the Diesel soot.

Generally, catalysts containing alkali or alkaline oxides have been used to substantially reduce the Diesel soot ignition temperature significantly as described, for example, in JP 2001-17449; WO 03/011437; US 2002/0132727 and US 2002/0197191. Unfortunately, these catalyst are volatile and destructive to the filters resulting in impractical short life times. In addition, these catalysts still have required substantial amounts of noble metal catalysts to reduce the HC and CO gases that are emitted along with the Diesel soot.

Other oxides such as rare earth oxides (e.g., U.S. Pat. No. 4,515,758; US 2002/0197191; US 2002/0044897; US 2003/0124037; WO 01/02083) and base metal oxides have also been used in conjunction with noble metal catalysts to attempt to lower the Diesel soot ignition temperature while also catalyzing the HC and CO emissions. Unfortunately, these catalysts have tended to required substantial amounts of expensive noble metal catalysts and/or rare earth oxides.

Therefore, it would be desirable to provide a catalyst for a Diesel particulate filter that avoids one or more problems of the prior art such as one of the aforementioned problems. In particular, it would be desirable to provide a catalyst that eliminates the amount of expensive rare earth oxide and noble metal catalysts that have been required in the prior art to oxidize soot, while still achieving long lifetimes.

SUMMARY OF THE INVENTION

A first aspect of this invention is a catalyzed soot filter comprising a porous ceramic having, on at least a portion of the porous ceramic, an amorphous catalytic phase comprised of an alkali containing oxide glass having therein Si, Al or combination thereof. Surprisingly, the catalyzed soot filter displays excellent soot combustion, long lifetimes without either rapid alkali volatilization or attack of the porous ceramic as is common with alkali oxide catalysts. Likewise, the balance point temperature, the temperature at which the soot burning rate achieved by the Diesel particulate filter is equal to the soot accumulation rate in the filter, maybe as low or lower than typical alkali oxide based soot catalysts, noble metal catalysts, rare earth catalysts and combinations thereof.

A second aspect of the invention is a method of forming a catalyzed soot filter comprising, exposing a porous ceramic body to an alkali containing compound that is a silicate, aluminate, alumino-silicate, or combination thereof such that at least a portion of the porous ceramic is in contact with the alkali containing compound and heating the contacted porous ceramic to a temperature sufficient to fuse thereto an alkali containing oxide glass comprising Si, Al or combination thereof. Surprisingly, the method allows the incorporation of the alkali into the glass phase, whereas simply contacting, for example, with an alkali oxide fails to achieve the incorporation into a fused alkali containing glass phase to the porous ceramic. Even more surprisingly, the method may improve the mechanical properties of the porous ceramic, whereas simply contacting with an alkali oxide almost invariably is destructive to the porous ceramic.

The catalyzed soot filter may be used in any applications in which soot needs to be removed from a gaseous stream such as an automobile, train, truck or stationary power plant exhaust. The catalyzed soot filter is particularly useful to remove soot from Diesel engine exhausts.

DETAILED DESCRIPTION OF THE INVENTION

The invention is a catalyzed soot filter, soot being a carbon based material such as described above for Diesel soot. The catalyzed soot filter is comprised of a porous ceramic.

The porous ceramic body may be any suitable ceramic, for example, such as those known in the art for filtering Diesel soot. Preferably, the porous ceramic is one that has an oxide grain boundary phase or oxide phase on at least a portion surface of the ceramic of the porous ceramic in which such phase is comprised of Si, Al, or combination thereof (i.e., silica, alumina, silicate, aluminate, or alumino-silicate essentially free of any alkali present therein). Preferably the entire surface of the ceramic has the aforementioned phase thereon. Essentially free of an alkali, for example, means that the porous ceramic such as mullite, cordierite or silicon carbide has at most about 0.05 parts per 100 parts by weight of the porous ceramic absent the amorphous catalytic phase.

Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. No. US 6,669,751B1 and WO publications EP1142619A1, WO 2002/070106A1. Other suitable porous bodies are described by WO 2004/011386A1, WO 2004/011124A1, US 2004/0020359A1 and WO 2003/051488A1.

The mullite is preferably a mullite having an acicular microstructure. Examples of such acicular ceramic porous bodies include those described by U.S. Pat. Nos. 5,194,154; 5,173,349; 5,198,007; 5,098,455; 5,340,516; 6,596,665 and 6,306,335; U.S. patent application Publication No. 2001/0038810; and International PCT publication WO 03/082773.

The porous ceramic body, generally, has a porosity of about 30% to 85%. Preferably, the porous ceramic body has a porosity of at least about 40%, more preferably at least about 45%, even more preferably at least about 50%, and most preferably at least about 55% to preferably at most about 80%, more preferably at most about 75%, and most preferably at most about 70%.

The porous ceramic body has on at least a portion of the porous ceramic a catalytic amorphous phase. Portion means any effective amount of the catalytic phase present on the porous ceramic body such that the soot balance temperature is lowered compared to a bare porous ceramic body of like composition. Generally, at least about 10% of the porous ceramic is covered by the catalytic phase. Preferably, at least about 20%, more preferably at least about 30%, even more preferably at least about 50%, and most preferably at least about 75% of the porous ceramic body is covered by the catalytic phase. In a preferred embodiment essentially the entire surface of the porous ceramic is covered by the catalytic phase.

In a preferred embodiment, at least a portion of the catalytic phase is fused to the porous ceramic body. Fused means that the catalytic phase is bound to the porous ceramic bonded via a covalent or polar bond. For example, the catalytic phase may be present as a grain boundary amorphous phase on the ceramic grains of the porous ceramic body as well as being present in the ceramic grain boundary junctions. In this preferred body, generally, all of the catalytic phase is fused to the ceramic grains of the porous ceramic body.

The catalytic phase is amorphous. Amorphous means that there is no molecular structure that is detectable using typical analytical techniques. That is, there may be some very small ordered structure, but due to the size of such order, the techniques to measure such order, for example, fails to detect or is not substantially different than an amorphous material. For example, the ordered domains may be of such a small size that X-ray diffraction or electron diffraction results in such diffuse scattering that if such domains were present they would be of a size of at most about 50 to 100 nanometers.

Even though the catalytic phase is amorphous, a small portion of the alkali may precipitate as a carbonate or bicarbonate when the amount of alkali increases relative to the amount of silicate, aluminate or combination thereof of the colloid applied. Illustratively, an X-ray diffraction pattern may display small peaks discernable above the noise of the X-ray technique. For example, at a mole ratio of $Cs_2O$ to $SiO_2$ of 1 to 1 in the colloid applied to an acicular mullite porous ceramic body such carbonate/bicarbonate peaks have been observed and these catalysts are still an embodiment of this invention. At lower ratios, such carbonate/bicarbonate peaks become less and less discernable. For example, at a ratio of about 1 to 4, such peaks are difficult to discern from the background noise if at all.

The catalytic phase is comprised of an alkali containing oxide glass having Si, Al or combination thereof. The glass may contain any alkali or combination of alkali atoms. Preferably, the alkali is Na, K, Rb, Cs or combination thereof. More preferably the alkali is Na, K, Cs or combination thereof. Even more preferably the alkali is K, Cs or combination thereof. Most preferably the alkali is K or Cs.

The amount of alkali in the glass may be any amount sufficient to catalyze the combustion of soot. Generally, the amount of alkali within the glass is from about 0.01 to 50% by mole. Preferably the amount of alkali within the glass is at least about 0.5%, more preferably at least about 1% and most preferably at least about 2% to preferably at most about 25%, more preferably at most about 20%, and most preferably at most about 15% by mole. The amount of alkali, generally, corresponds to an amount of alkali present within the catalyzed porous ceramic body of at least about 0.05% to about 10% by weight. Preferably the amount of alkali is at least about 0.1%, more preferably at least about 0.2% and most preferably at least about 0.3% to preferably at most about 7%, more preferably at most about 5% and most preferably at most about 3% by weight.

The oxide glass in addition to the alkali has Si, Al, or combination thereof. This means that within the glass, there are silicate (Si—O tetrahedral structures), aluminate (Al—O octahedral structures) or combinations thereof. The amount of Si, Al or combination thereof may vary over a large range, so long as there is enough such that, for example, the volatility of the alkali at typical operating temperatures (about 500° C.) is suppressed. Generally, the amount of Si, Al, or combination can vary over a wide range depending on the glass and alkali present in the glass and other components that may be present in the glass. For example the Si, Al, or combination thereof may range from 99.95 to 50 mole percent. In a preferred embodiment, the oxide glass is a silicate. In a particularly preferred embodiment, the silicate is a potassium silicate.

In addition to the amorphous catalytic phase, the porous ceramic may also have other catalysts useful, for example, in Diesel exhausts. For example, NOx catalysts or storage compounds, HC catalysts, CO catalysts and the like may be present on the porous ceramic body. Examples of such optional catalysts are as follows.

A first exemplary optional catalyst is directly bound-metal catalysts, such as noble metals, base metals and combinations thereof. Examples of noble metal catalysts include platinum, rhodium, palladium, ruthenium, rhenium, silver and alloys thereof. Examples of base metal catalysts include copper, chromium, iron, cobalt, nickel, zinc, manganese, vanadium, titanium, scandium and combinations thereof. The metal catalyst, preferably, is in the form of a metal, but may be present as an inorganic compound, such as an oxide, nitride and carbide, or as a defect structure within the ceramic grains of the porous ceramic. The metal may be applied by any suitable technique, such as those known in the art. For example, the metal catalyst may be applied by chemical vapor deposition.

A second exemplary optional catalyst is one that is incorporated into the lattice structure of the ceramic grains of the porous ceramic. For example, an element may be Ce, Zr, La, Mg, Ca, a metal element described in the previous paragraph or combinations thereof. These elements may be incorporated in any suitable manner, such as those known in the art.

A third exemplary optional catalyst is a combination of ceramic particles having metal deposited thereon. These are typically referred to as wash coats. Generally, wash coats consist of micrometer sized ceramic particles, such as zeolite, aluminosilicate, silica, ceria, zirconia, barium oxide, barium carbonate and alumina particles that have metal deposited thereon. The metal may be any previously described for directly deposited metal. A particularly preferred wash coat catalyst coating is one comprised of alumina particles having a noble metal thereon. It is understood that the wash coat may be comprised of more than one metal oxide, such as alumina having oxides of at least one of zirconium, barium, lanthanum, magnesium and cerium.

A fourth exemplary optional catalyst is a perovskite-type catalyst comprising a metal oxide composition, such as those described by Golden in U.S. Pat. No. 5,939,354.

The amorphous catalytic phase components alkali, Si, Al or combination thereof may be deposited upon the porous ceramic by any suitable method such as one known in the art. For example one or more of the catalyst components may be deposited by a method such as described in U.S. Pat. Nos. 4,515,758; 4,740,360; 5,013,705; 5,063,192; 5,130,109; 5,254,519; 5,993,762 and; U.S. patent application Publications No. 2002/0044897; 2002/0197191 and 2003/0124037; International Patent Publication WO97/00119; WO 99/12642; WO 00/62923; WO 01/02083 and WO 03/011437; and Great Britain Patent No. 1,119,180.

In one embodiment, the catalyst alkali component or components maybe deposited by precipitating a compound such as an alkali silicate, aluminate or combination thereof dissolved in a liquid (generally water) containing the alkali silicate, aluminate, or alumino-silicate.

Preferably, the catalytic phase is prepared by exposing the porous ceramic body to an alkali containing compound that is a silicate, aluminate, or alumino-silicate or combination thereof. Generally, the alkali silicate, aluminate or aluminosilicate is a colloid dispersed within a liquid. Colloid herein means a particulate having an average particle size of less than 1 micrometer by number. The colloid may be crystalline or amorphous. Preferably, the colloid is amorphous. The colloid is preferably a Na, Cs, K or combination thereof silicate. Preferably the colloid is a Cs, K or combination thereof silicate. Most preferably, the colloid is K or Cs silicate. Exemplary alkali silicates, aluminates, alumino-silicates include, clays, synthetic colloids such as those known in the art and available under the tradenames such as KASIL and N, PQ Corporation, PO Box 840, Valley Forge, Pa.; ZACSIL, Zaclon Incorporated, 2981 Independence Rd., Cleveland, Ohio; Sodium Silicates, Occidental Chemical Corporation, Occidental Tower, 5005 LBJ Freeway, Dallas, Tex.

The colloid preferably has a small particle size where all of the particles are less than 1 micrometer in diameter by number. Preferably the average particle size is less than about 500 nanometers (nm), more preferably less than about 250 nm, even more preferably less than about 100 nm, and most preferably less than about 50 nm to preferably at least about 1 nm, more preferably at least about 5 nm, and most preferably at least about 10 nm in diameter by number.

The porous body may be exposed to the aforementioned alkali silicate, aluminate or alumino-silicate by any suitable method such as those known in the art. For example, a liquid dispersion of the colloid may be impregnated into the porous body by spraying, dipping, immersing and then dried.

After contacting the porous ceramic, for example, with the colloid, the porous body is heated, for example, to form the amorphous catalytic phase and if desired fuse the catalytic phase to the porous ceramic body. Generally, the heating temperature is at least about 400° C. to about 1600° C. Typically, the temperature is at least about 500° C. to about 1000° C. Generally, the atmosphere needs to contain a sufficient amount of oxygen to ensure the glass is a silicate, aluminate or alumino-silicate (i.e., one containing oxygen). Generally, air is suitable to heat the catalyst components to form the amorphous catalytic phase. If desired or necessary, another heating in a reducing or inert atmosphere to similar temperatures just described may be performed to facilitate the formation of other optional catalyst such as a noble metal.

Surprisingly, the catalyzed filter has improved soot combustion compared to the same filter catalyzed simply with an alkali oxide in that the balance point temperature is often at least as low and the lifetime is substantially improved. In addition, the soot combustion temperature is substantially lower than typical ceria and noble metal catalysts for soot combustion.

EXAMPLES

Example 1

A 2×5 cells by about 1.5 inch long portion of an acicular mullite diesel particulate filter (200 cells/in$^2$), which was prepared in the same manner as described in Example 4 of WO 03/082773A1 (including heat treating to 1400° C. as also described in Example 4 of WO 03/082773A1), was impregnated with enough potassium silicate solution (KASIL #1, PQ Corp., Valley Forge, Pa.) to fill the wall pore volume then dried in an oven at 115° C. The dried sample was calcined at 800° C. for 1 hr.

The bar was sprayed with a suspension containing 5 wt % carbon black (Regal 330R, Cabot Corporation, Boston, Mass.) dispersed with about 0.5% by weight of the slurry TRITON X-100 (Rohm & Haas, Philadelphia, Pa.) surfactant in $H_2O$, then oven dried at 115° C. Approximately 0.5 mg of carbon black was deposited on the bar forming an opaque black coating. The bar was placed in a tube furnace at 550° C. for 10 min then removed. The carbon black had completely burned off.

The bar was cycled through the combustion test just described repeatedly except that the furnace conditions were changed to 575° C. for 15 minutes. After 48 cycles the carbon was still completely burned off, at which time this combustion test was stopped.

Example 2

A second bar was prepared in the same manner as example 1 except a SiC diesel particulate filter (Ibiden Co., LTD, Ogaki-shi, Japan) was used instead of the acicular mullite diesel particulate filter. The bar was tested in the same way and the carbon was completely burned off at 550° C. and after 28 cycles at 575° C. the soot was still completely burned off, at which time the test was stopped.

Example 3

A third bar was prepared in the same manner as example 1 except a cordierite diesel particulate filter (Corning Incorporated, Corning, N.Y.) was used instead of the acicular mullite diesel particulate filter. The bar was tested the same way as described in Example 2 and the bar had the same results as Example 2.

Example 4

A fourth bar was prepared in the same manner as example 1 except the bar was impregnated with a cesium silicate solution (3.92 $SiO_2$:$Cs_2O$) then dried in an oven at 115° C. The solution was created by heating fumed silica with 50% CsOH by weight balance water to a temperature of 85° C. for 4 hours. The dried sample was calcined at 700° C. for 1 hr.

The bar was tested in the same way except that 5% oil by weight (Mobil 1, ExxonMobil Corporation, Irving, Tex.) was added to the carbon slurry. The carbon was completely burned off at 500° C. and after 450 cycles at 550° C. the soot was still completely burned off, at which time the test was stopped.

Comparative Example 1

A portion of an acicular mullite diesel particulate filter 2×5 cells by 1.5 inch long the same as in Example 1, was impregnated with enough 20 wt % nitrate-stabilized ceria sol (Nyacol Nano Technologies, Inc, Ashland, Mass.) to fill the wall pore volume then dried in an oven at 115° C. The dried sample was calcined at 800° C. for 1 hr. The bar was tested at 550° C. as described in Example 1. The bar remained black with soot.

Comparative Example 2

A bar was made in the same way as described in Example 1, except that no catalyst was added to the substrate. The bar was tested at 550° C. in the same was as described in Example 1. The bar remained black with soot.

What is claimed is:

1. A catalyzed soot filter comprising a porous ceramic having, on at least a portion of the porous ceramic, an amorphous catalytic phase comprised of an alkali containing oxide glass having therein Si, Al or combination thereof, wherein the porous ceramic has an amount of alkali that is at least about 0.1 to at most about 7 percent by weight of the porous ceramic and amorphous catalytic phase.

2. The catalyzed soot filter of claim 1, wherein the alkali containing glass has an alkali that is Na, K, Cs or combination thereof.

3. The catalyzed soot filter of claim 2, wherein the alkali is Cs, K or combination thereof.

4. The catalyzed soot filter of claim 3, wherein the alkali is K.

5. The catalyzed soot filter of claim 1, wherein the alkali containing oxide glass is a silicate.

6. The catalyzed soot filter of claim 1, wherein the amount of alkali is at least about 0.2 percent.

7. The catalyzed soot filter of claim 6, wherein the amount of alkali is at least about 0.3 percent.

8. The catalyzed soot filter of claim 6, wherein the amount of alkali is at most about 5 percent.

9. The catalyzed soot filter of claim 8, wherein the amount of alkali is at most about 3 percent.

10. The catalyzed soot filter of claim 1, wherein the porous ceramic is mullite, cordierite, silicon carbide or combination thereof.

11. The catalyzed soot filter of claim 10, wherein the porous ceramic is cordierite or mullite.

12. The catalyzed soot filter of claim 11, wherein the porous ceramic is mullite.

13. The catalyzed soot filter of claim 12, wherein the porous ceramic is acicular mullite.

14. A method of forming a catalyzed soot filter comprising, exposing a porous ceramic body to an alkali containing compound that is a silicate, aluminate, alumino-silicate, or combination thereof such that at least a portion of the porous ceramic is in contact with the alkali containing compound and heating the contacted porous ceramic to a temperature sufficient to fuse thereto an alkali containing oxide glass comprising Si, Al or combination thereof, wherein said temperature is from about 500° to about 1000° C.

15. The method of claim 14, wherein the alkali containing compound has an alkali that is K, Na, Cs or combination thereof.

16. The method of claim 15, wherein the alkali is Cs, K or combination thereof.

17. The method of claim 16, wherein the alkali is K.

18. The method of claim 14, wherein the alkali containing compound is the silicate.

19. The method of claim 14, wherein the alkali containing compound is a colloid that has an average particle size of less than about 500 nm in diameter by number.

20. The method of claim 14, wherein the alkali containing compound is a colloidal alkali silicate.

21. The method of claim 20, wherein the colloidal alkali silicate has an alkali that is K, Cs or combination thereof.

22. The method of claim 21, wherein the alkali is K.

23. The method of claim 14, wherein the alkali containing compound is a clay.

24. The method of claim 14, wherein the porous ceramic body is one that has an oxide phase on at least portion of the surface of the ceramic of the porous ceramic in which such surface phase is comprised of Si, Al, or combination thereof essentially free of an alkali.

25. The method of claim 24, wherein the porous ceramic is cordierite, mullite, silicon carbide or combination thereof.

26. The method of claim 25, wherein the porous ceramic is mullite or cordierite of combination thereof.

27. The method of claim 26, wherein the porous ceramic is mullite.

28. The method of claim 27, wherein the mullite is acicular mullite.

29. The catalyzed soot filter of claim 3, wherein the alkali is Cs.

30. The method of claim 16, wherein the alkali is Cs.

* * * * *